US 11,378,177 B2

(12) United States Patent
Morreale et al.

(10) Patent No.: US 11,378,177 B2
(45) Date of Patent: Jul. 5, 2022

(54) PLANETARY GEARSET

(71) Applicant: SAFRAN TRANSMISSION SYSTEMS, Colombes (FR)

(72) Inventors: Serge René Morreale, Moissy-Cramayel (FR); Fabien Roger Gaston Caty, Moissy-Cramayel (FR); Patrice Jocelyn Francis Gedin, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 262 days.

(21) Appl. No.: 16/605,045

(22) PCT Filed: Apr. 10, 2018

(86) PCT No.: PCT/FR2018/050897
§ 371 (c)(1),
(2) Date: Oct. 14, 2019

(87) PCT Pub. No.: WO2018/189476
PCT Pub. Date: Oct. 18, 2018

(65) Prior Publication Data
US 2021/0102617 A1 Apr. 8, 2021

(30) Foreign Application Priority Data
Apr. 14, 2017 (FR) ...................... 1753296

(51) Int. Cl.
*F16H 57/04* (2010.01)
*F01D 25/18* (2006.01)
*F02C 7/06* (2006.01)

(52) U.S. Cl.
CPC ......... *F16H 57/0427* (2013.01); *F01D 25/18* (2013.01); *F02C 7/06* (2013.01);
(Continued)

(58) Field of Classification Search
CPC ............... F16H 57/046; F16H 57/0427; F16H 57/0429; F02C 7/06; F01D 25/18
See application file for complete search history.

(56) References Cited

U.S. PATENT DOCUMENTS

| 5,107,676 A * | 4/1992 | Hadaway ................ F01D 25/18 |
| | | 184/6.11 |
| 2011/0299974 A1* | 12/2011 | Gauthier ................ F02C 3/107 |
| | | 415/122.1 |

(Continued)

FOREIGN PATENT DOCUMENTS

| FR | 2 987 416 | 8/2013 |
| FR | 3 041 054 | 3/2017 |
| WO | WO2010092263 | 8/2010 |

OTHER PUBLICATIONS

International Patent Application No. PCT/FR2018/050897, International Search Report and Written Opinion dated Jul. 12, 2018, 10 pgs. (relevance in citations and English translation of ISR).

*Primary Examiner* — Derek D Knight
(74) *Attorney, Agent, or Firm* — Lathrop GPM LLP

(57) ABSTRACT

The invention concerns an epicycloidal gear train (10) comprising a central pinion (26), an outer crown (28) and satellite pinions (32) in engagement with the central pinion (26) and the outer crown (28) and each mounted freely rotatable on a satellite carrier (36), the gear train (10) comprising an annular cup (56) being integral with the satellite carrier (36) and open radially inward. According to the invention, the cup (56) is divided into a circumferential succession of first basins (60) of the first oil circuit and second basins (62) of the second oil circuit, the first basins (60) being fluidly separated from the second cells (62) and characterised in that the cup (56) comprises two annular walls (56*a*, 56*b*) axially facing, the annular wall (56*b*) of which is furthest from a median transverse plane (74) of the (Continued)

gear train (10) has openings (76) opening into the second basins (62).

15 Claims, 2 Drawing Sheets

(52) U.S. Cl.
CPC ....... *F16H 57/046* (2013.01); *F16H 57/0479* (2013.01); *F16H 57/0486* (2013.01); *F05D 2220/323* (2013.01); *F05D 2260/98* (2013.01)

(56) References Cited

U.S. PATENT DOCUMENTS

2013/0225353 A1\* 8/2013 Gallet ................. F16H 57/0423
   475/159
2018/0258794 A1\* 9/2018 Gedin ................. F16H 57/0482

\* cited by examiner

PLANETARY GEARSET

CROSS-REFERENCE TO RELATED APPLICATIONS

This application is a 35 U.S.C. § 371 filing of International Application No. PCT/FR2018/050897 filed Apr. 10, 2018, which claims the benefit of priority to French Patent Application No. 1753296 filed Apr. 14, 2017, each of which is incorporated herein by reference in its entirety.

The field of the present invention is that of turbomachinery and more particularly epicycloidal gear trains and among epicycloidal gear trains more specifically epicycloidal reducers and differential transmissions.

Typically, an epicycloidal gear train consists of a planetary or central pinion, a planetary or outer crown and satellite pinions that are in engagement with the planetary pinion and the crown, the support of one of these three components being locked in rotation for the operation of the gear train. When the satellite carrier is fixed in rotation, the central pinion and crown are driving and driven, respectively, or vice versa. The lubrication and cooling of the gears and axes of the satellite pinions is then not a problem and is ensured by nozzles that are fixed in rotation and can project oil permanently on the meshing areas of the satellite pinions with the central pinion and with the crown and on the satellite pinion axes.

However, in the most frequent case, the outer crown is fixed in rotation and the central pinion and the satellite carrier are driving and driven, respectively. This type of arrangement is preferred in cases where a reduction ratio of more than three is desired since it is less cumbersome. Lubrication of the meshing zones and satellite pinion shafts is then a problem that is solved in current technology by complex networks of pressurized oil routing pipes, using dynamic seals or rotating joints that are subject to wear and which must be checked and replaced regularly.

Thus, the applicant proposed in her application WOA12010092263 a lubrication device in which a fixed injector sprays oil into an annular cup fixed to a satellite carrier, the oil being recovered by centrifugation and then directed to means for lubricating the pinions. This device avoids the use of dynamic or rotating seals, which improves the reliability of the reducer lubrication system and its maintenance.

In a second known configuration, the nozzle can be carried by the shaft carrying the central pinion so that its oil jet is directed towards the cup.

However, in either of the two above-mentioned configurations, at low rotation speed, the oil flow from the nozzles may be too high in relation to the rotation speed of the satellite carrier so that oil accumulates in the annular cup, leading to parasitic oil spills. In addition, excess oil can circulate inside the satellite pinion axes, leading to excessive heating of the oil, which should be cooled later.

The purpose of the invention is in particular to provide a simple, effective and economical solution to the problems of the prior art described above.

To this end, the present invention offers an epicycloidal gear train comprising a central pinion, an outer crown and satellite pinions in engagement with the central pinion and the outer crown and each mounted freely rotatable on a satellite carrier, the gear train comprising a first lubrication oil circuit for the contact areas of the satellite pinion teeth with the central pinion and a second lubrication oil circuit for the satellite pinion axes, an annular cup being integral with the satellite carrier and open radially inward, characterized in that the cup is divided into a circumferential succession of first basins of the first oil circuit and second basins of the second oil circuit, the first basins being fluidly separated from the second basins and in that the cup comprises two axially opposite annular walls whose annular wall furthest from a median transverse plane of the gear train comprises openings leading to the second basins.

According to the invention, the openings made in the portions of the wall delimiting the second basins laterally allow the excess oil to escape through the openings.

Preferably, openings are only made in the portions of the wall delimiting the second basins, while the first basins that provide an oil supply to the contact areas of the satellite pinion teeth with the central pinion do not include an opening to avoid reducing the pressure in the first circuit.

According to the invention, the openings are formed circumferentially in the annular wall furthest from the transverse plane, at the level of the parts delimiting the second basins.

According to another characteristic of the invention, the openings include notches delimiting a part of the radially inner annular edge of said annular wall so that said annular edge is notched. The notches can have a depth, in radial direction, of about 20 to 50% of the depth of the first basins.

In a particular embodiment of the invention, the notches extend over the entire angular distance of a second basin.

The invention is particularly interesting when the first basins are connected to first oil supply lines in the contact area between the gear teeth of the satellite pinions and the central pinion teeth, and the second basins are connected to second oil supply lines of the satellite pinion axes.

The invention also concerns a turbomachine comprising a gear train as described above, the central pinion of which surrounds and is rotationally fixed to a shaft of the turbomachine, and oil spraying means arranged radially outside the shaft and having at least one oil nozzle spraying oil towards the annular cup.

Said nozzle can be carried by the outer surface of the shaft and positioned so that its oil jet is directed towards the cup.

The gear train is, advantageously, a reducer and is mounted in an annular chamber formed radially inside a low-pressure compressor, the satellite carrier being connected to an upstream fan wheel and the shaft being a shaft of the low-pressure compressor.

In a particular assembly configuration, the gear unit is axially interposed between an upstream and a downstream bearing supported by a stator structure of the low-pressure compressor, the upstream bearing guiding in rotation a connecting shaft from the fan wheel to the satellite carrier and the downstream bearing guiding in rotation the shaft of the low-pressure compressor.

Also, the first fixed oil spraying means can be integrated into an oil circuit further comprising second oil spraying means on the upstream and downstream bearings and a pump for simultaneous feeding the first and second oil spraying means. This makes it possible to simplify the design of the oil supply to the turbomachine.

The invention is, for example, applicable to a gear train, such as a gear train in which the outer crown is fixed. In this case, the gear train can be called a reducer since the output speed, i.e. that of the satellite carrier, is lower than the input speed, i.e. that of the rotating drive shaft of the central pinion. The invention also relates to a differential transmission gear train, in which the satellite carrier and the outer crown are movable in rotation in opposite directions, the satellite carrier preferably driving a first upstream fan wheel and the outer crown preferably driving a second downstream fan wheel. With such an arrangement, a double counter rotating fan wheel assembly is obtained.

The invention will be better understood, and other details, characteristics and advantages of the invention will appear upon reading the following description given by way of a non restrictive example while referring to the appended drawings wherein.

Figure 1:
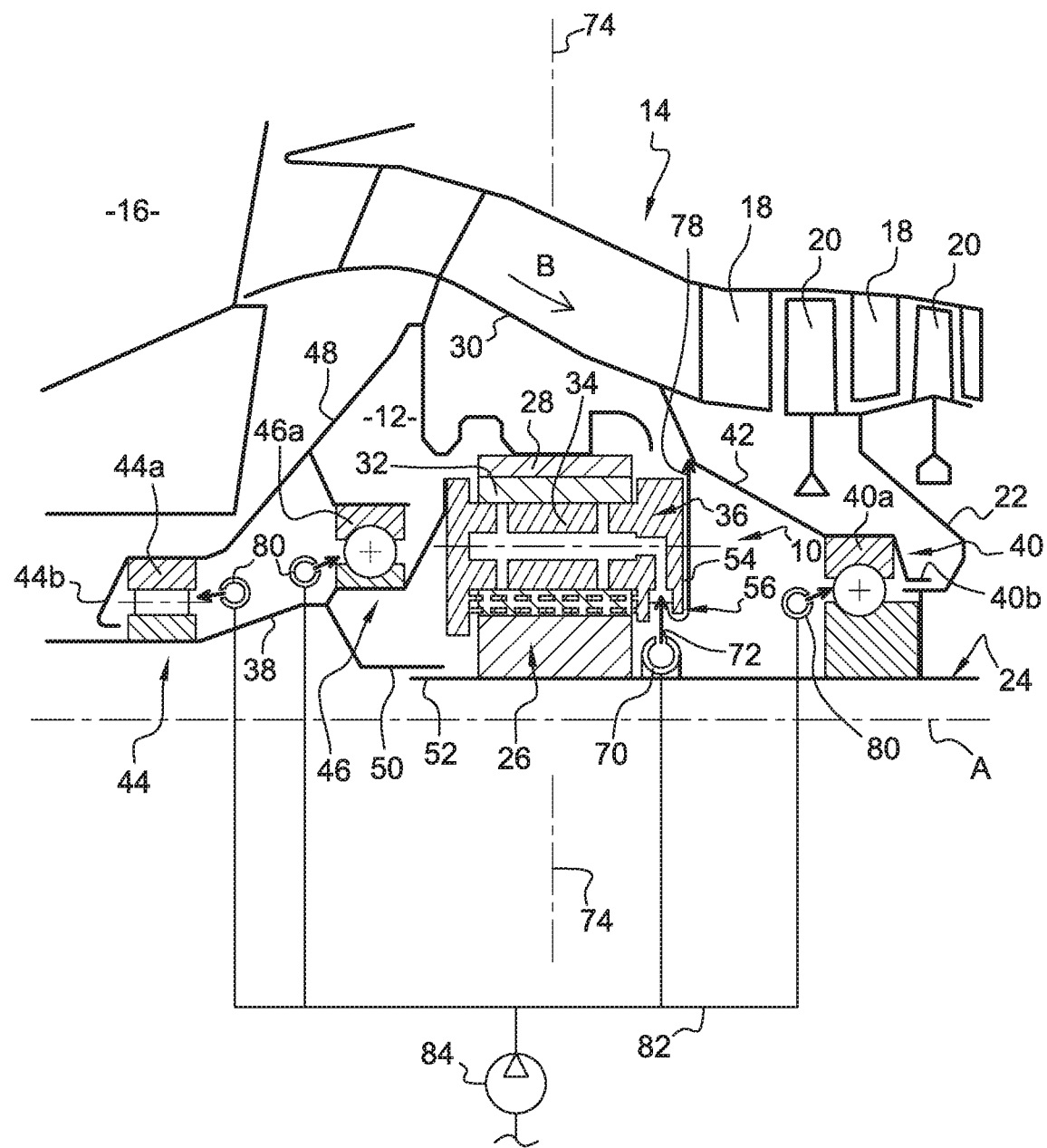
FIG. 1 is a schematic axial sectional half-view of an epicycloidal gear train reducer in a turbomachine according to the invention.

First of all, we refer to FIG. 1, which schematically represents a reducer 10, according to the invention, with epicycloidal gear trains mounted in a turbomachine such as an aircraft turbojet. Specifically, the gear train 10 is mounted in a radially formed annular chamber 12 inside a low-pressure compressor 14 arranged downstream of the fan wheel 16 and upstream of a high-pressure compressor (not shown). The low-pressure compressor 14 comprises a plurality of rows of fixed vanes 18 and annular rows of moving vanes 20 arranged axially, along axis A, alternately. The rows of moving vanes 20 are connected by an annular wall 22 to a low-pressure shaft 24, which also rotates the vanes of a downstream low-pressure turbine (not shown).

The gear train reducer 10 comprises a central pinion 26 or planetary pinion surrounding the upstream end of the shaft 24 of the low-pressure compressor and fixed to it, an outer crown 28 or planetary ring gear surrounding the central pinion 26 and fixedly connected to an annular wall 30 defining internally the flow vein of the primary air flow (arrow B) flowing in the low-pressure compressor 14. The reducer 10 also includes satellite pinions 32 which are engaged by their teeth with gears of the central pinion 26 and the outer crown 28. These satellite pinions 32 are mounted freely rotating on axes 34 of a satellite carrier 36 whose upstream end is connected by a connecting shaft 38 to the fan wheel 16.

The shaft 24 of the low-pressure compressor 14 is supported and guided in rotation by a downstream ball bearing 40 whose outer ring 40a is fixed to a first stator part 42 of the low-pressure compressor 14 connected externally to the inner annular wall 30 of the primary air vein. The connecting shaft 38 is supported and guided in rotation by two bearings 44, 46 arranged upstream of the reducer 10, among which a first bearing 44 arranged upstream of a second bearing 46 is a roller bearing, the second bearing 46 being a ball bearing. The outer crowns 44a, 46a of the first and second bearings are supported by a second stator part 48 of the low-pressure compressor connected externally to the inner annular wall 30 of the primary air vein.

The annular chamber 12 of the epicycloidal gear train reducer 10 is thus delimited radially inwardly by the shaft 24 of the low-pressure compressor 14, radially outwardly by the first 42 and second 48 stator parts and the inner annular wall 30 of the primary air vein, upstream by the first upstream bearing 44 and downstream by the downstream bearing 40. It should be noted that the connecting shaft 38 also includes an annular wall 50 that cooperates sealingly with the upstream end 52 of the shaft 24 of the low-pressure compressor 14 to prevent lubricating oil leaks at this point. Similarly, to limit oil leaks, the outer crown 44a of the first upstream bearing 44 and the outer crown 40a of the downstream bearing 40 each have an annular portion 44b, 40b cooperating sealingly with the connecting shaft 38 and the shaft 24 of the low-pressure compressor 14[1], respectively.

[1] Note du traducteur: erreur de référence dans la source

The rotation of the satellite pinions 32 in the axes 34 of the satellite carrier is carried out by means of sliding bearings.

Figure 2:
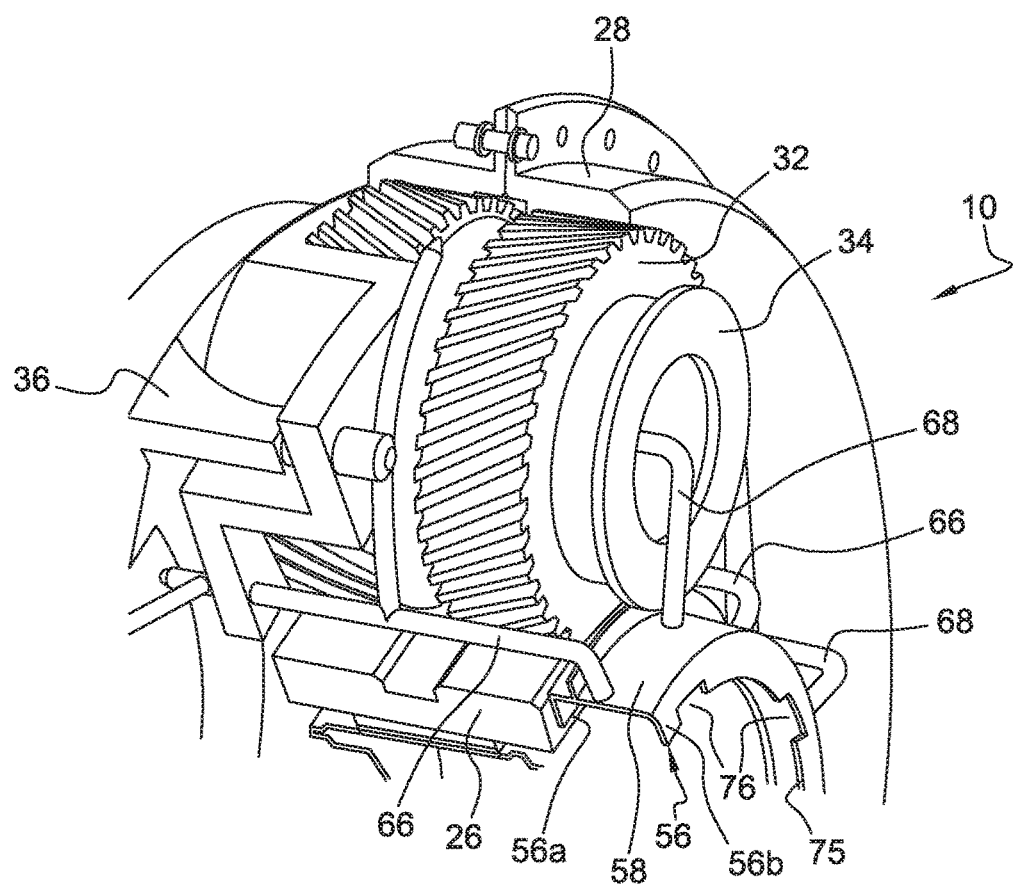
FIG. 2 is a truncated schematic perspective view of the gear train reducer and of the satellite lubrication means.

The epicycloidal gear train reducer 10 includes lubrication means by spraying oil on the gear teeth of satellite pinions 32 and their axes 34, these means including a first oil circuit and a second oil circuit that are independent and which receive the oil from an impeller 54 arranged downstream of the reducer 10 and having an annular cup 56, more particularly circular in shape (FIG. 2). The cup 56 has a U-shaped section, the opening of which is oriented radially towards the axis A, i. e. towards the low pressure shaft 24. The cup 56 of the impeller 54 comprises a cylindrical bottom wall 58 connected at its upstream and downstream axial ends to radial annular walls 56a, 56b (FIG. 2). The cup 56 is circumferentially divided into a succession of basins 60, 62 separated circumferentially by radially oriented walls 64 and extending axially between the two radial ring walls 56a, 56b. In the example shown in FIG. 3, the circumferential separation walls 64 delimit first basins 60 alternating with second basins 62. The first basins 60 belong to the first oil circuit and the second basins belong to the second oil circuit. As it can be seen, the first basins 60 may have a smaller angular range than the second basins 62.

Figure 3:
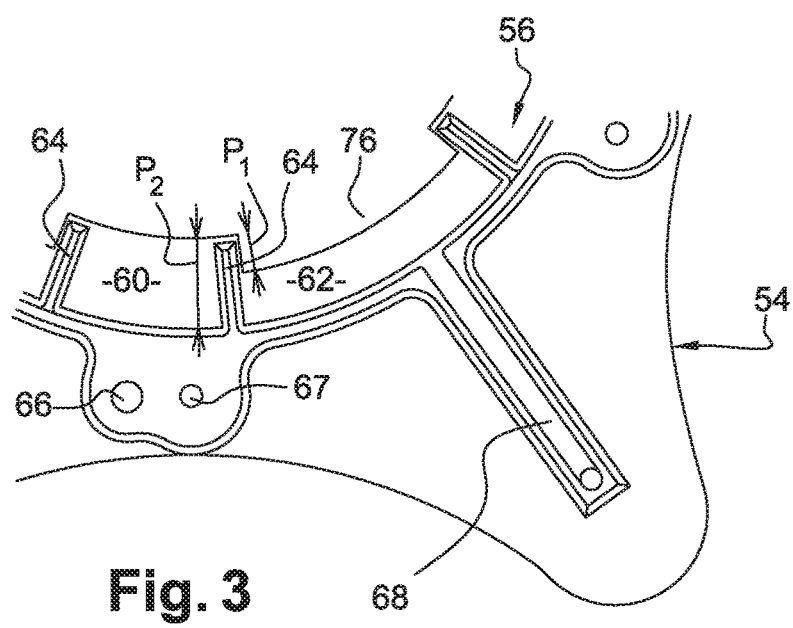
FIG. 3 is a schematic sectional view of an impeller according to the invention.

The first basins 60 each have an oil outlet port formed in the bottom cylindrical wall 58 and leading into first oil supply lines 66 of the contact area between the teeth of the satellite pinions 32 and the teeth of the central pinion 26 (FIGS. 2 and 3). The second basins 62 each have an oil outlet port formed in the bottom cylindrical wall 58 and opening into second oil supply lines 68 of the axes 34 of the satellite pinions 32 (FIGS. 2 and 3). In FIG. 3, hole 67 allows the annular cup 56 to be fixed to the satellite carrier 36.

The first basins 60 are different from the second basins 62 and the differences are essentially intended to ensure an optimal oil supply to the elements arranged at different radial positions. These differences also make it possible to direct the excess oil away from the reducer and force lubrication of the elements closest to the shaft, i. e. the contact area between the teeth of the satellite pinion 32 and the teeth of the central pinion 26. Thus, the second basins may be shallower than the first basins.

Oil spraying means are also provided and include a plurality of oil nozzles 72 distributed around axis A and connected to a pump and an oil tank (FIG. 1). In an embodiment of the invention, oil nozzles 72 are orifices arranged on a fixed ring 70 surrounding the shaft 24. This ring 70 is mounted in the radial space between the annular cup 56 and the shaft 24. These nozzles 72 are oriented so that their oil jets project oil towards the cup 70, between the radial annular walls 56a, 56b. The projection direction is preferably radial, possibly slightly inclined downstream, upstream or according to the direction of rotation, i.e. the projection direction is included in an angular cone with a radial axis and an opening of 20°.

The diameter of a nozzle 72 must be greater than the maximum diameter of the particles likely to clog the nozzles. The diameter must also be large enough to ensure a flow of oil to the cup 56 and energetic enough to be straight over a distance of about 5 cm. In a practical embodiment of the invention, the oil spraying means are configured to have an outlet pressure of about 1 bar in the least favourable regimes such as idling. If you want to move the nozzles 72 away from the cup, you must increase the oil pressure.

As shown in FIG. 3, the downstream radial annular wall 56b of the cup 56, i. e. the radial annular wall 56b furthest from a median radial plane 74 of the reducer 10, has openings 76 having in the example shown the shape of notches that open into the second basins 62. These notches 76 are formed in the radially inner annular edge 75 of the radial wall downstream 56b. In particular, the notches are formed in the portions of the downstream radial annular wall 56b defining the second basins 62 laterally. In this way, it can be seen that the downstream radial annular wall 56b forms a notched annular wall. With such an arrangement, it is possible to better regulate the oil flow to the first and second oil circuits. Indeed, when the oil flow supplying the nozzles 72 is regulated by a pump whose output flow is directly proportional to the speed of a shaft of the high-pressure compressor, it follows that in the idling phase the oil flow may be too high in the second oil circuit supplying the axes of the satellite pinions 32, which is avoided by making slots 76 on the portions of the downstream radial annular wall 56b of the second basins 62. The excess oil (arrow 78) then flows through the notches directly onto the frustoconical wall 30 of the low-pressure compressor 14 on contact with which the oil cools. The oil then flows by gravity to the lowest point of the turbomachine and is collected by a collector arranged at six o'clock in relation to the dial of a watch.

In a particular embodiment of the invention, the notches may have a depth P1, in radial direction, of the order of 20 to 50% of the depth P2 of the first basins 60.

Of course, notches 76 could be replaced by circular or oblong openings providing the same function of regulating the quantity of oil. Thus, the term opening refers to a passage in the annular wall of the cup 56 which is the furthest from the median plane 74 of the reducer 10, i. e. with reference to the figures the downstream radial annular wall 56b of the cup 56. It is understood that the opening could have many forms, all of which fall within the scope of the protection conferred on the invention.

With reference again to FIG. 1, the turbomachine also includes second oil spraying means 80 on the upstream roller bearings 44, 46 and the downstream bearing 40. These first 70 and second 80 oil spraying means are integrated into the same oil circuit 82 which also includes a pump 84. This pump 84 simultaneously supplies the first oil spraying means 70 supplying the epicycloidal reducer 10 and the second supply means of the bearings 40, 44, 46.

Thus, the assembly according to the invention of an annular bailer fixed to the shaft makes it possible to ensure a centrifugation of the oil at low speed and it is possible to have a feed pump whose operating speed does not need to be a function of the rotational speed of the shaft 24 driving the central pinion. In a particular configuration, the operating speed of the pump can also be chosen to be dependent on the speed of a high-pressure shaft of the turbomachine such as the high-pressure compressor shaft.

The invention claimed is:

1. An epicycloidal gear train comprising a central pinion, an outer crown and satellite pinions engaging the central pinion and the outer crown and each mounted freely rotatable on a satellite carrier, the gear train comprising a first lubrication oil circuit for contact areas of the gear teeth of the satellite pinions with the central pinion and a second lubrication oil circuit for axes of the satellite pinions, an annular cup being integral with the satellite carrier and open radially inward, characterized in that the cup is divided into a circumferential succession of first basins of the first oil circuit and second basins of the second oil circuit, the first basins (60) being fluidly separated from the second basins and in that the cup comprises a first and a second annular wall axially facing, said first annular wall being further from a median radial plane of the gear train than said second annular wall, said first annular wall having openings opening into the second basins.

2. A gear train according to claim 1, characterized in that the openings comprise notches delimiting a portion of a radially inner annular edge of said first annular wall so that said annular edge includes notches.

3. A gear train according to claim 2, characterized in that the notches extend over an entire angular distance of one of said second basins.

4. A gear train according to claim 1, characterized in that the first basins are connected to first oil supply lines of said contact areas between said teeth of the satellite pinions and said teeth of the central pinion, and in that the second basins are connected to second oil supply lines of the axes of the satellite pinions.

5. A gear train according to claim 2, characterized in that the first basins are connected to first oil supply lines of said contact areas between said teeth of the satellite pinions and said teeth of the central pinion, and in that the second basins are connected to second oil supply lines of the axes of the satellite pinions.

6. A gear train according to claim 3, characterized in that the first basins are connected to first oil supply lines of said contact areas between said teeth of the satellite pinions and said teeth of the central pinion, and in that the second basins are connected to second oil supply lines of the axes of the satellite pinions.

7. A turbomachine comprising a gear train according to claim 1, the central pinion of which surrounds and is rotationally fixed to a shaft of the turbomachine, and first oil spraying means arranged radially outside the shaft and having at least one oil nozzle projecting oil towards the annular cup.

8. A turbomachine comprising a gear train according to claim 2, the central pinion of which surrounds and is rotationally fixed to a shaft of the turbomachine, and first oil spraying means arranged radially outside the shaft and having at least one oil nozzle projecting oil towards the annular cup.

9. A turbomachine comprising a gear train according to claim 3, the central pinion of which surrounds and is rotationally fixed to a shaft of the turbomachine, and first oil spraying means arranged radially outside the shaft and having at least one oil nozzle projecting oil towards the annular cup.

10. A turbomachine comprising a gear train according to claim 4, the central pinion of which surrounds and is rotationally fixed to a shaft of the turbomachine, and first oil spraying means arranged radially outside the shaft and having at least one oil nozzle projecting oil towards the annular cup.

11. Turbomachine according to claim 7, characterized in that said at least one nozzle is carried by an outer surface of the shaft and positioned so that its oil jet is directed towards the cup.

12. Turbomachine according to claim 7, characterized in that the gear train is a reducer and is mounted in an annular chamber formed radially inside a low-pressure compressor, the satellite carrier being connected to an upstream fan wheel and the shaft being a shaft of the low-pressure compressor.

13. Turbomachine according to claim 11, characterized in that the gear train is a reducer and is mounted in an annular chamber formed radially inside a low-pressure compressor, the satellite carrier being connected to an upstream fan wheel and the shaft being a shaft of the low-pressure compressor.

14. Turbomachine according to claim 12, characterized in that the gear train reducer is axially interposed between an upstream bearing and a downstream bearing supported by a stator structure of the low-pressure compressor, the upstream bearing rotatably guiding a connecting shaft (38) from the fan wheel to the satellite carrier and the downstream bearing rotatably guiding the shaft of the low-pressure compressor.

15. Turbomachine according to claim 14, characterized in that the first oil spraying means are fixed and are integrated into an oil circuit further comprising second oil spraying means on the upstream bearing and the downstream bearing and a pump for simultaneous feeding of the first and second oil spraying means.

\* \* \* \* \*